United States Patent [19]

Cambridge et al.

[11] Patent Number: 4,634,581

[45] Date of Patent: Jan. 6, 1987

[54] PRODUCTION OF HIGH PURITY ALUMINA

[75] Inventors: Edward L. Cambridge; Raouf O. Loutfy; James C. Withers; Daniel M. Blake, all of Tucson, Ariz.

[73] Assignee: Atlantic Richfield Company, Los Angeles, Calif.

[21] Appl. No.: 826,468

[22] Filed: Feb. 5, 1986

Related U.S. Application Data

[63] Continuation-in-part of Ser. No. 519,799, Aug. 8, 1983, abandoned.

[51] Int. Cl.$^4$ ................................................. C01F 7/46
[52] U.S. Cl. ...................................... 423/126; 423/132
[58] Field of Search ................................. 423/126, 132

[56] References Cited

U.S. PATENT DOCUMENTS

| | | | |
|---|---|---|---|
| 1,519,880 | 12/1924 | Speckter et al. | 423/126 |
| 4,056,363 | 11/1977 | Messner | 423/126 |
| 4,222,989 | 9/1980 | Belsky et al. | 423/126 |
| 4,239,735 | 12/1980 | Eisele et al. | 423/132 |
| 4,297,327 | 10/1981 | Gjelsvik et al. | 423/126 |
| 4,465,659 | 8/1984 | Cambridge et al. | 423/126 |

Primary Examiner—H. T. Carter
Attorney, Agent, or Firm—Craig E. Larson

[57] ABSTRACT

A process is described for the formation of high purity alumina from Bayer Process alumina trihydrate (gibbsite). The solid hydrated alumina is reacted with concentrated HCl to cause partial or complete conversion to aluminum chloride hexahydrate (ACH). The ACH or mixture of ACH and unreacted hydrated alumina is recovered as a solid and calcined in a single or multistage calcination to high purity alumina. Soda contents in the product anhydrous alumina can be reduced by 98% or greater. Contents of other impurities, such as silica, iron, magnesium, etc., are also markedly reduced. Different degrees of impurity reduction can be obtained by controlling the degree of conversion of the hydrated alumina to ACH and by recycling and treating the acid after solid/liquid separation. The purified products find use in the specialty ceramics field, as catalyst supports, as adsorbents, in electronic components, in prosthetic devices or other applications in which alumina of controlled degrees of purity offers an advantage.

20 Claims, 1 Drawing Figure

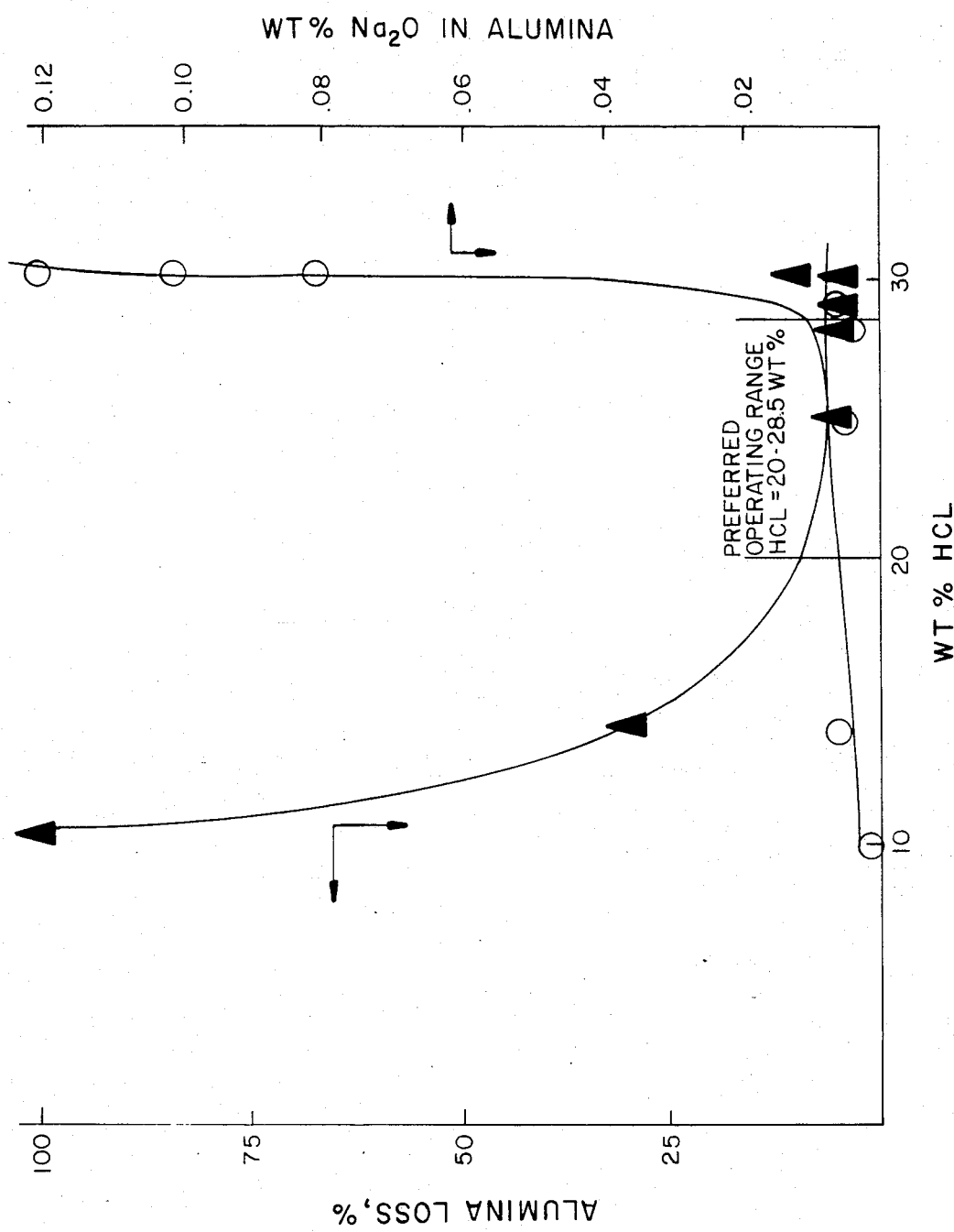

PRODUCTION OF HIGH PURITY ALUMINA

CROSS-REFERENCE TO RELATED CASE

This application is a continuation-in-part of U.S. patent application Ser. No. 519,799 filed Aug. 8, 1983 and now abandoned.

TECHNICAL FIELD

The invention herein relates to the purification of hydrated alumina and to formation of alumina. More particularly it relates to the production of grades of high purity alumina suitable for use in ceramics, electronic components, synthetic sapphire, catalyst supports, translucent materials and other applications requiring alumina of low impurity contents.

BACKGROUND ART

Alumina is a raw material used in the production of many different types of ceramic materials, catalyst supports and refractories. Most commercial alumina is produced according to the "Bayer Process", a well known process for the production of alumina from bauxite. In the Bayer Process, bauxite is mixed with hot concentrated NaOH which dissolves some of the alumina, silica and other components of the bauxite. Most of the silica and other materials are reprecipitated and eliminated as a solid waste referred to as "red mud". The dissolved alumina is then separated in solution from remaining solids and crystalized as alumina trihydrate, alpha-$Al_2O_3 \cdot 3H_2O$ ("gibbsite"). Because it is formed in a sodium hydroxide environment, the gibbsite contains a significant amount (usually 0.3 to 0.4%) soda, $Na_2O$. (All percentages herein are by weight unless otherwise noted.) In addition, the economics of the Bayer Process are such that significant amounts of other impurities such as silica are tolerated in the gibbsite product. A typical analysis of gibbsite from the Bayer Process is shown in Table I. In accordance with the usual practice, impurities are expressed as the stable oxide form.

TABLE I

| Impurities | Concentration, % |
|---|---|
| $Na_2O$ | 0.3 |
| CaO | 0.01 |
| ZnO | 0.004 |
| $SiO_2$ | 0.04 |
| $Fe_2O_3$ | 0.01 |

A number of other minor oxides are also present, in quantities of less than a few hundred ppm each. When the Bayer Process alumina trihydrate is calcined to produced anhydrous alumina, $Al_2O_3$, the impurities are concentrated by a factor of about 1.5.

While most of the commercial hydrated alumina is produced by the Bayer Process as described, it is possible to produce hydrated alumina by other methods. To the extent that such other methods result in the inclusion of unacceptably high levels of one or more impurities in the hydrated alumina, the purification process of the present invention will be applicable to purification of those materials. For brevity herein, however, the process of this invention will be described in terms of the purification of Bayer Process-produced gibbsite, although it is to be understood the it is acceptable to all impure hydrated aluminas.

For most alumina uses, such as electrolytic production of aluminum metal or formation of ordinary ceramic products and refractories, the gibbsite is entirely adequate even with these high levels of impurities present. For a number of applications, however, these impurity levels (particularly the high soda level) are unacceptable. These applications include products intended for use in the electronics industry, as supports for certain types of catalytic materials, as synthetic sapphire and as translucent bodies. Depending upon the particular application or product, maximum alumina impurity levels for materials such as soda, silica or iron oxide may be as low as 0.002%.

At present most commercially available aluminas of low soda ($Na_2O$) content are derived from the gibbsite made by the Bayer Process. Reduction in soda levels is accomplished by one of several methods that can attain, at best, minimum $Na_2O$ levels of 0.02-0.05%. The most common type of method involves a partial conversion of gibbsite to an active form of alumina which is treated with an aqueous solution of a chloride source such as ammonium chloride, weak hydrochloric acid or aluminum chloride. After removal of the liquid phase the resulting solid containing adsorbed chlorides is calcined at temperatures greater than 1000° C. to yield alumina with soda contents of 0.02-0.9%. This type of process is described, for instance, in German Offen. No. 2,816,1914; German Offen. No. 1,276,017; and Canadian Pat. No. 795,706. These methods are restricted to production of alumina suitable for applications which can tolerate more than 0.02% $Na_2O$.

A different method of soda reduction involves calcination of gibbsite in the presence of a substance containing at least 10% silica at 1260° C. The soda is selectively concentrated in the silica which is then separated by screening from the alumina. The product alumina has a soda level of 0.02%, and also has an elevated quantity of $SiO_2$ of about 0.02%. See U.S. Pat. No. 3,106,452.

A process for recovering high purity alumina from waste streams from the hydrochloric acid etch of aluminum for electronics uses has been reported by Ruthner, et al in the published proceedings of the ICSOBA Third International Congress (Nice, 19173), pages 546-555. Very low levels of impurities are attained, but for economic reasons the method is applicable only when a highly pure waste stream of aqueous aluminum chloride is available. A number of other methods have been proposed that start with pure aluminum metal, organoaluminum compounds or alums. These in general start with a high cost material or generate products not recycleable to the process when calcined and are therefore not applicable to commercial production.

DISCLOSURE OF INVENTION

We have now discovered a process by which alumina of varying degrees of enhanced purity can be easily obtained from hydrated forms of alumina. These may be gibbsite, bayerite, boehmite, diaspore or any other form of impure hydrated alumina. The invention herein is therefore a process for the reduction of the impurity content in alumina or alumina presursors produced from a solid hydrated alumina containing a significant impurity content.

In one embodiment, the invention is a process for removing impurities from solid hydrated alumina which comprises:

(a) reacting solid hydrated alumina with aqueous hydrochloric acid to dissolve at least a portion of said impurities in the acid and to convert at least a portion of the solid hydrated alumina to solid aluminum chloride hexahydrate while maintaining the acid concentration of the reaction mixture above about 15% by weight (preferably above about 20% by weight) and (b) withdrawing reaction mixture having an acid concentration of about 15 to 30% by weight (preferably about 20 to 28.5% by weight) and recovering solid aluminum chloride hexahydrate and any unreacted solid hydrated alumina from the acid and dissolved impurities.

In another embodiment, the invention is a process for the reduction of the impurity content in alumina produced from solid hydrated alumina containing a significant impurity content, which comprises:

a. reacting the solid hydrated alumina with concentrated hydrochloric acid to convert at least a portion of the hydrated alumina to solid aluminum chloride hexahydrates;

b. recovering the solid aluminum chloride hexahydrate and any unreacted solid hydrated alumina from the acid containing the dissolved impurities; and c. calcining the solid materials so recovered to separate HCl and water and to form substantially anhydrous amorphous or crystalline alumina having a lower impurity content than the hydrated alumina.

The process can produce aluminas or alumina precursors of varying degrees of enhanced purity by varying the degree of conversion of hydrated alumina to aluminum chloride hexahydrate (ACH) in the acid conversion step and/or by recycle of recovered HCl and removal of a part of the impurity-containing recycle stream or impurity removal from at least a part of that recycle stream. In one embodiment the hydrated alumina is fully converted to ACH and the impurity level is reduced to a minimum.

In other embodiments the solid materials recovered in step (b) may be redissolved and resolidified to achieve enhanced purity. This may, if desired, be repeated more than once.

Calcining in step (c) is preferably carried out in two stages, the first of which reduces the chloride and water levels in the alumina by up to 99%, while the second stage reduces it further up to 99.99%.

BRIEF DESCRIPTION OF THE DRAWING

The FIGURE is a plot of results obtained in Examples 1-10.

MODES FOR CARRYING OUT THE INVENTION

The invention herein is a process for producing high purity alumina from relatively impure hydrated alumina, exemplified by Bayer Process gibbsite. In the present invention, the impurities are reduced to a very low level by converting the hydrated alumina to ACH in concentrated hydrochloric acid followed by calcination of the ACH to produce high purity essentially anhydrous alumina.

The principal reaction of the present invention is the conversion of the hydrated alumina to ACH in concentrated hydrochloric acid according to the following reaction:

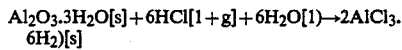

For this reaction the concentration of the hydrochloric acid will normally be in the range of 15–35% acid, preferably 20–30%. No additional water beyond that present as the concentrated acid solution is added. Additional concentrated acid and/or gaseous HCl can be added as the reaction progresses or as additional hydrated alumina is fed to the process, so that the process may be run as either a batch or a continous operation. If the acid concentration is reduced much below about 15%, the reaction rate and yield of the ACH will be significantly reduced. For instance, using 10% hydrochloric acid produces essentially no solid $AlCl_3.6H_2O$ after 24 hours.

The present invention is believed to function to form the low impurity precursor for the final alumina product by reactively dissolving both the hydrated alumina and the major portion of its included impurity metal oxides. The dissolved aluminous material then combines with the chloride portion of the hydrochloric acid to form ACH which in the defined range of acid concentration precipitates spontaneously as a solid. The impurity oxides, on the other hand, at this acid concentration remain substantially dissolved in the acid, so that the subsequent solid/liquid separation process separates high purity ACH from the impure solution. However, if the concentration of the acid is raised much beyond approximately 30–35%, impurities present in the raw material will also precipitate out with the ACH in significant quantities.

During the leaching of the hydrated alumina in hydrochloric acid solution, the alumina and impurities are converted into their corresponding chloride salts. Alumina is converted into aluminum chloride hexahydrate. Some of the aluminum chloride hexahydrate dissolved in solution and its degree of solubility is a function of the HCl concentration. The higher the HCl concentration, the lower the solubility of the ACH. Thus, if one's sole purpose is to recover the alumina value after leaching, then one needs to operate at as high an HCL concentration as possible. However, the solubility of impurities such as chloride salts, particularly that of NaCl, also decreases with increasing the HCl concentration. Thus, operating at a high final HCl concentration results in the precipitation of the NaCl together with the ACH, which upon calcination produces aluminas contaminated with $Na_2O$.

Thus, a trade-off exists between minimizing alumina loss on the one hand and mximizing impurity removal on the other hand. In a particular embodiment of this invention, it has been found that it is possible to achieve both apparently conflicting goals by maintaining the acid concentration of the leach step above about 15%, preferably above about 20%, by weight and by maintaining the final acid concentration at about 15 to about 30% by weight, preferably about 20 to about 28.5% by weight. The concentration of acid fed to the leach step is not therefore narrowly critical (although dilute acid is clearly unsuitable).

The acid conversion reaction is normally operated in the temperature range of 40°–120° C. in a closed vessel. The closed vessel prevents escape of any gaseous chloride materials and facilitates the recovery and recycle of the HCl and water. The reaction is conducted under nominally ambient pressure conditions, but during the course of the reaction there will be a small pressure increase within the closed vessel due to the vapor pressures of evolved hydrogen chloride and water. The preferred temperatures for the operation of the process are usually in the range of 70°–80° C., but that preferred range can vary depending on the particular materials from which the reaction vessel is constructed, due to differing degrees of resistance to the corrosive attack of the hot concentrated acid. The initial percent solids in the reaction mixture is in the range of 5–40% (by weight). The preferred range is 10–20%. At the end of the reaction, the slurry has a solids content in the range of 12–60% with the preferred value being between 25–50%.

The degree of purity to be achieved in the product alumina will be determined in part by the degree of conversion of the hydrated alumina to ACH in the acid solution. The highest degree of purity, in which the soda, silica and other impurities are normally less than 0.01%, often less than 50 ppm, in the product alumina will be obtained when the acid reaction is run to complete conversion of hydrated alumina to ACH. All the impurities will have been dissolved into the acid with complete dissolution of the hydrated alumina and the amount of impurities precipitating with the ACH will be minimized. The degree of alumina purification will also be dependent on the treatment of HCl recycle, if, as is economically desirable, the HCl-containing liquid is recycled back to the conversion from the solid/liquid separation step described below. If the recycle stream containing the dissolved impurities were not treated, the impurity level in the product would eventually build up to the level of the impure raw materials. Therefore, at least a portion (usually 25–50%) of the recycle stream is withdrawn and either disposed of as waste or, preferably, treated to separate the impurities from the HCl and water. The purified HCl/water fraction is then returned with the other (untreated) portion of the recycle stream to the conversion process to maximize the utilization of HCl.

Further purification, if required for some applications, can be accomplished by redissolution and resolidification of the ACH. This can be accomplished by dissolving in a suitable medium, i.e., water or dilute or concentrated hydrochloric acid, followed by resolidification by hydrochloric acid addition or gas sparging with HCl. In this way $Na_2O$ content can be reduced to as low as 0.002–0.003%.

For some applications, however, alumina needs to be purified but not necessarily to the maximum degree. It is possible with the present process to produce alumina of different degrees of purification simply by varying the degree of conversion to ACH in the acid solution, usually along with varying of the degree of purification of the recycle fraction or the volume of that fraction. If the reaction is halted at some point before complete conversion of the hydrated alumina to ACH and the solids present are separated and recovered, it will be found that the solid product is a mixture of unconverted hydrated alumina and high purity ACH. When this mixture is subject to calcination as described below, the final alumina product will be found to contain some fraction of those residual impurities which were present in the unreacted portion of the hydrated alumina. The resultant impurity level in the product has been found not to be directly proportional to the degree of conversion, however. Surprisingly, the impurity level in material produced by this conversion process is in general found to be below that expected based on a simple averaging of the mixed solids. For example, 54% conversion by this process of a sample of $Al_2O_3.3H_2O$ containing 0.3% $Na_2O$ gives a product $Al_2O_3$ having 0.09% $Na_2O$ instead of the expected 0.24% $Na_2O$. It is known there are different applications for aluminas containing a range of impurities (for instance, from 0.15% to 0.005% of soda) and it is a simple matter with the present process to determine the optimum time/temperature relationship to obtain the proper amount of conversion of Bayer ATH to obtain each of these products. The actual impurity level for any desired product will be a matter of routine experimentation for one skilled in the art. As an example, a reaction run to 24% conversion of gibbsite to $AlCl_3.6H_2O$ carried out at 45° C. for 30 minutes at a final acid concentration of 30% HCl yielded alumina with 0.12% $Na_2O$. A similar experiment run for 60 minutes gave 100% conversion at 90° C. and a soda level below 0.006%.

Normally it will be found that complete conversion of hydrated alumina to ACH within the temperature ranges stated above, will occur in a time on the order to 40 to 150 minutes. Lesser degrees of conversion of the hydrated alumina will, of course, require proportionately less time at equivalent temperatures. Similarly, variation in temperature will have an inverse effect on reaction time.

In the description below regarding the calcination to produce the product alumina, it will be assumed for brevity that the conversion to ACH is complete. It will be understood, however, that all references to ACH below will also be equally applicable to mixtures of ACH and unreacted hydrated alumina in those instances where the operator has elected to run the reaction to a point less than full conversion.

Following completion of the acid reaction, the precipitated ACH is separated from the acid solution by conventional solid/liquid separation techniques. It is thereafter washed at least once (preferably several times) with highly concentrated HCl solutions to remove remaining traces of the reaction liquor containing dissolved impurities. The washing step is an integral part of impurity removal, for it eliminates impurities carried with the ACH by adsorption of co-precipitation, and also removes the traces of impure process liquor adhering to the solid ACH surfaces. For example, when 50 g $AlCl_3.6H_2O$ containing 0.04% $Na_2O$ was washed with 100 ml of concentrated hydrochloric acid, the clean solid contained only 0.002% $Na_2O$. Washing with water or diluted acid is to be avoided, since the ACH will dissolve in such liquids. For that reason it is also desirable to keep the concentration of the wash acid from 25 to 35% HCl (preferably 30–35%) to minimize any redissolution of the ACH particles.

The liquor recovered in the solid/liquid separation step is recycled to the reaction step of the process. As described above, a fraction (usually about 25–50%) is purified to control impurity levels in the system.

The calcination of solid ACH or mixtures of partially converted hydrated alumina and ACH may be accomplished in rotary kilns, flash calciners or fluidized bed calciners. In one variation of this process a concentrated aqueous solution of ACH can be decomposed in a spray roaster to produce a form of alumina and regenerate water and hydrochloric acid.

The temperature at which the decomposition occurs determines the nature of the aluminous product. Decomposition occurs over the range of 150° C. to 1400° C. Decomposition at temperatures below 700° C. generates an amorphous solid having a composition dependent on the calcining temperature. The major components expressed as $Al_2O_3$ and chloride expressed as Cl are present in the following amounts at 400° C. (5–8% Cl and 91–95% $Al_2O_3$) and at 700° C. (3–5% Cl and 94–97% $Al_2O_3$). In the range of 700°–800° C. the calcination yields one or more transition alumina phases having less than 0.5% residual chloride. At 800° C. the calcination product is 100% one or more transition alumina phases with 0.25% Cl content. Between 800° C. and 1200° C. the relative proportions of the transition alumina phases and alpha alumina depends on the conditions of preparation. Above 1350° C. the product of calcination is 100% alpha-$Al_2O_3$.

The calcination is preferably performed in two stages. In the first stage, preferably conducted at 400° C. to 800° C. for a period of 15 to 100 minutes, the HCl and water contents are reduced by 90-99%. In the second

EXAMPLE 11

A 450 gm sample of $AlCl_3.6H_2O$ prepared from gibbsite by reaction with hydrochloric acid, followed by washing with 200 ml of 35% hydrochloric acid, yielded alumina having 0.04% $Na_2O$ after calcination at 1000° C. Washing 50 gm of the $AlCl_3.6H_2O$ with 100 ml of 35% hydrochloric acid gave a material which contained 0.002% $Na_2O$ after calcination at 1000° C.

EXAMPLE 12

A 185 g sample of $AlCl_3.6H_2O$ produced by this

TABLE 2

| Exp. No. | Temp, °C. | Time, Min. | Final HCl Conc., % | Conv. % | Recovery of Alumina*, % | Impurities in Product Alumina, % | | | |
|---|---|---|---|---|---|---|---|---|---|
| | | | | | | Soda | Ferric Oxide | Silica | Lime |
| 1 | — | — | — | 0 | — | 0.45 | 0.20 | 0.06 | 0.02 |
| 2 | 45 | 30 | 30 | 24 | 95 | 0.12 | 0.06 | 0.02 | 0.01 |
| 3 | 45 | 60 | 30 | 42 | 95 | 0.1 | 0.03 | 0.02 | 0.008 |
| 4 | 70 | 15 | 30 | 54 | 90 | 0.09 | 0.002 | 0.02 | 0.005 |
| 5 | 70 | 30 | 30 | 70 | 90 | 0.08 | 0.005 | 0.03 | 0.005 |
| 6 | 70 | 120 | 28 | 100 | 95 | 0.004 | 0.003 | 0.007 | 0.002 |
| 7 | 90 | 60 | 29 | 100 | 95 | 0.006 | 0.004 | 0.006 | 0.002 |
| 8 | 90 | 50 | 25 | 100 | 95 | 0.005 | 0.003 | 0.005 | 0.001 |
| 9 | 105 | 1440 | 10 | 94 | 0 | — | — | — | — |
| 10 | 110 | 60 | 14 | 80 | 70 | 0.006 | 0.004 | 0.01 | 0.008 |

*As ACH or unreacted hydrated alumina stage, preferably conducted at 800° C. to 1350° C. for 10 to 100 minutes, the HCl and water contents are further reduced by 98-99.99%. As will be recognized by those skilled in the art, these ranges of time and temperature may be varied somewhat, depending on the materials involved, particle size and similar factors. The precise conditions which are optimum for each stage will be a matter of routine determination.

The calcination step surprisingly provides additional reduction in levels of $Na_2O$ in the alumina product. Calcination of the fully or partially converted product from solid/liquid separation in the range 750°-1350° C. results in some elimination of sodium, probably in the form of sodium chloride or sodium aluminum chloride. Thus, ACH containing 0.06% $Na_2O$ calcined at 1000° C. yielded alumina having only 0.02% $Na_2O$. This is only 6.7% of the expected $Na_2O$ based on soda present in the original ACH.

The HCl and water recovered from calcination can be, and preferably are, recycled to the conversion step. Since they contain few impurities they need not be treated as is all or a portion of the other recycle stream described above.

The following examples, which are intended to be exemplary only and not limiting, will illustrate the process of this invention.

EXAMPLES 1-10

Typical conversion reactions used 700 ml of 35% hydrochloric acid and 161 gm $Al_2O_3.3H_2O$ (with 6% free moisture). The HCl consumed by the reaction was made up by bubbling hydrogen chloride gas through the mixture. The crystalline product was recovered by filtration and the product washed with 1 to 5 volumes of 35% hydrochloric acid. Material parpared was calcined at 1000° C. and analyzed for impurities. Analyses, recovery, percent conversion and reaction conditions for a range of experiments are given in Table 2. The "final HCl conc." shown in Table 2 was maintained substantially constant throughout the duration of each run. The FIGURE is a plot of alumina loss and $Na_2O$ impurities in the product as a function of HCl concentration.

process, and containing 0.06±0.01% $Na_2O$ was calcined at 1000° C. for one hour. At the end of that time the alumina product weighed 29.9 gm and contained 0.02±0.01% $Na_2O$. If all the soda contained in the $AlCl_3.6H_2O$ remained in the alumina the concentration would be expected to be 0.30±0.05% $Na_2O$.

EXAMPLE 13

A 100 gm sample of $AlCl_3.6H_2O$ (100 g) containing 0.04% $Na_2O$ was recrystallized from water (100 ml) by an HCl gas sparging method. The product (95 g) contained 0.005% $Na_2O$.

STATEMENT OF INDUSTRIAL APPLICATION

The invention herein is applicable to those industrial processes and products which require high purity alumina in their composition or for specific reactions. It is most immediately applicable to the ceramics industry and will provide alumina of different specified degrees of purity for various ceramic products, including electronic parts, insulators, catalyst supports, adsorbents, translucent bodies and synthetic sapphire.

It will be immediately evident to those skilled in the art that the invention herein encompasses embodiments which, while not specifically described above, are clearly within the scope of the present invention is to be determined solely by the appended claims.

What is claimed is:

1. A process useful for removing impurities from solid hydrated alumina containing a significant impurity content which comprises:
   (a) reacting solid hydrated alumina with aqueous hydrochloric acid to dissolve at least a portion of said impurities in the acid and to convert at least a portion of the solid hydrated alumina to solid aluminum chloride hexahydrate while maintaining the acid concentration of the reaction mixture above about 15% by weight and
   (b) withdrawing reaction mixture having an acid concentration of about 15 to about 30% by weight and recovering solid aluminum chloride hexahydrate and any unreacted solid hydrated alumina from the acid and dissolved impurities.

2. The process of claim 1 wherein the reaction mixture withdrawn has an acid concentration of about 20 to about 28.5% by weight.

3. The process of claim 2 wherein the acid concentration of the reaction mixture is maintained above about 20% by weight.

4. The process of claim 1 wherein the solid materials recovered from the acid and dissolved impurities are calcined to form substantially anhydrous, amorphous or crystalline alumina.

5. The process of claim 1 wherein the conversion of solid hydrated alumina to solid aluminum chloride hexahydrate is substantially complete.

6. The process of claim 1 wherein said acid remaining after step (b) is recycled for reuse back to step (a).

7. The process of claim 6 wherein at least a portion of said recycled acid is treated to remove said dissolved impurities therefrom prior to said portion being returned to step (a).

8. The process of claim 7 wherein said portion comprises 25-50% of the recycled hydrochloric acid.

9. The process of claim 1 further comprising dissolving said solid materials after recovery in step (b) and then resolidifying said dissolved materials and recovering said resolidified materials.

10. A process as in claim 9 wherein said dissolution and resolidification is performed at least twice, and solidified material is recovered after each repetition to be used in the next repetition.

11. A process as in claims 9 or 10 wherein said resolidification is by means of evaporative or gas sparging recrystallization with HCl or by addition of hydrochloric acid.

12. The process of claim 9 wherein the resolidified material is calcined to form substantially anhydrous, amorphous or crystalline alumina.

13. A process as in claims 4 or 12 wherein said calcining is accomplished in at least two stages.

14. A process as in claim 13 wherein the first stage of said calcination is conducted so as to remove up to 99 weight percent of included HCl and water, and the second stage is conducted so as to increase the degree of removal of included HCl and water up to as much as 99.99 weight percent.

15. A process as in claim 14 wherein the HCl recovered from calcination is recycled to step (a).

16. A process as in claims 4 or 12 wherein said hydrated alumina has a soda content greater than 0.25 weight percent and the alumina product has a soda content of not more than 0.15 weight percent.

17. A process as in claim 16 wherein the said soda content of said alumina product is not more than 0.1 weight percent.

18. A process as in claim 16 wherein the soda content of said alumina product is not more than 0.01 weight percent.

19. A process for the reduction of the impurity content in alumina produced from a solid hydrated alumina containing a significant impurity content, which comprises:

a. reacting said solid hydrated alumina with 15-35% by weight hydrochloric acid to convert at least a portion of said hydrated alumina to solid aluminum chloride hexahydrate and to dissolve at least a portion of said impurities in said acid;

b. recovering said solid aluminum chloride hexahydrate and any unreacted solid hydrate alumina from said acid containing said dissolved impurities; and c. calcining the solid materials so recovered to separate HCl and water and form substantially anhydrous amorphous or crystalline alumina having a lower impurity content than said hydrated alumina.

20. The process of claim 7 wherein the acid concentration is about 20 to about 30% by weight.

* * * * *